B. FORD.
SECONDARY OR STORAGE BATTERY.
APPLICATION FILED APR. 22, 1915.

1,210,786. Patented Jan. 2, 1917.

WITNESS
Robt R Hitch

INVENTOR
Bruce Ford
BY
Augustus B. Stoughton
ATTORNEY.

UNITED STATES PATENT OFFICE.

BRUCE FORD, OF PHILADELPHIA, PENNSYLVANIA.

SECONDARY OR STORAGE BATTERY.

1,210,786.

Specification of Letters Patent.  Patented Jan. 2, 1917.

Application filed April 22, 1915. Serial No. 23,009.

*To all whom it may concern:*

Be it known that I, BRUCE FORD, a citizen of the United States, and a resident of Philadelphia, in the county of Philadelphia and State of Pennsylvania, have invented certain new and useful Improvements in Secondary or Storage Batteries, of which the following is a specification.

Occasionally sea water reaches and floods the battery compartments or rooms of vessels or submarines and it is desirable to prevent or oppose the entry of sea water into the battery containers or jars, which though covered are usually vented.

The principal object of the present invention is to provide simple, reliable and efficient means for preventing or opposing the entry of sea water through the vent of storage battery jars or containers in cases of accidents in which the battery room or compartment is wholly or partly flooded or submerged.

To this and other ends hereinafter set forth the invention stated in general terms comprises the combination in a storage battery of a closed container or jar having a vent opening with a trap applied to the opening for opposing the entry of sea water.

The invention also comprises the improvements to be presently described and finally claimed.

Figure 1:
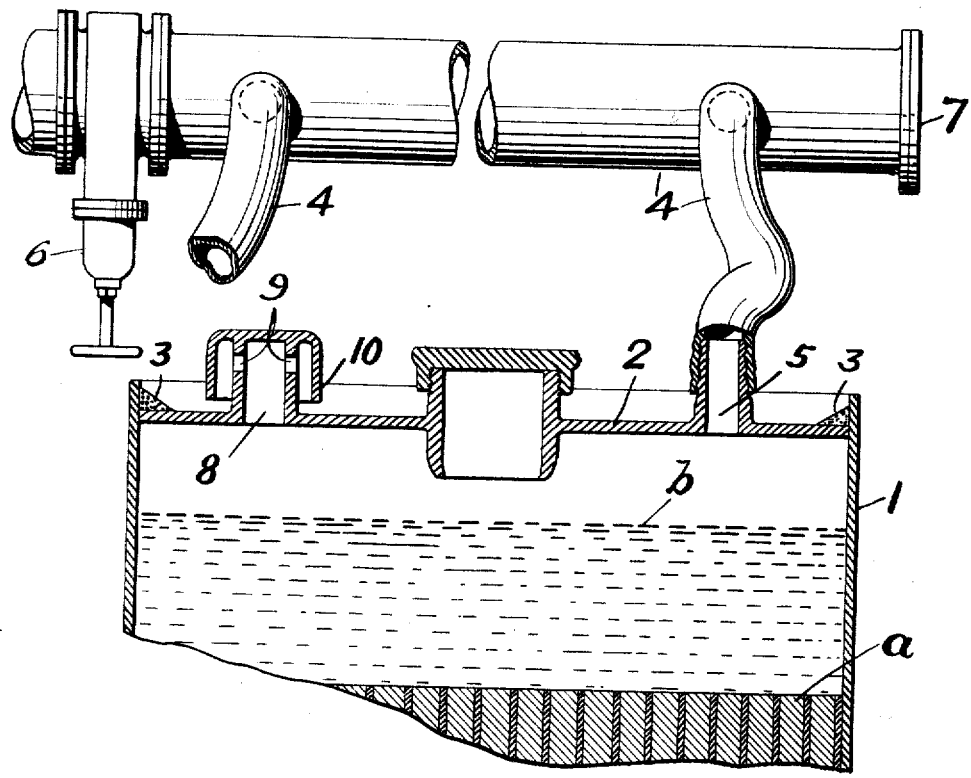
Figure 2:
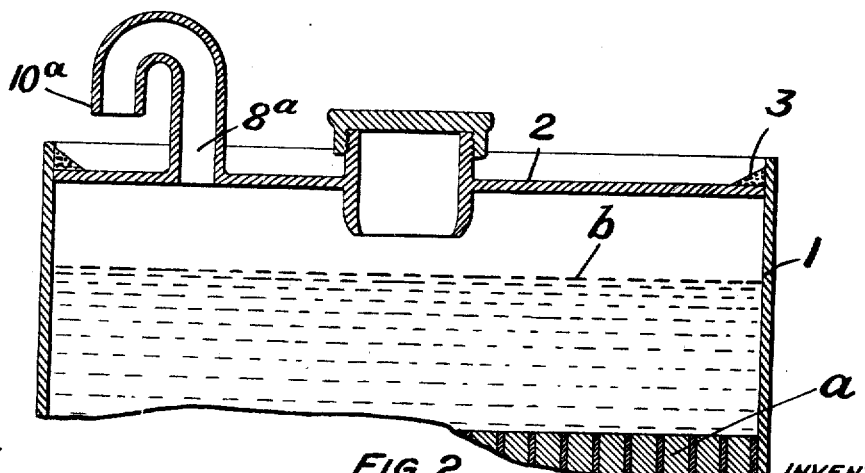

In the drawings Figure 1 is a view, partly diagrammatic and partly in section, illustrating features of the invention, and Fig. 2, is a sectional view illustrating a modification of the invention.

In the drawings 1 is a storage battery container or jar containing plates *a* and electrolyte *b*, and closed as by means of a cover 2, sealed as at 3.

8 is a vent opening.

The stem 9 having openings as shown in connection with the skirt 10, which depends around the stem, constitutes a sea water or air trap. A modification of the sea water trap is shown at 8ª and in this case the tubular stem is turned into inverted U-form so that its open end depends as at 10ª. The vent opening may be used either for the admission of air to the interior of the jar or container or it may be used for the escape of gas from the interior of the jar or container. As shown in Fig. 1, the vent opening is used for the inlet of air. To this end there is provided an exhaust connection 4 communicating with the jar or container as at 5. There are, of course, exhaust connections for different jars or containers and hence two such connections are shown. There are means for making the exhaust connections ineffective. As shown the valve indicated at 6 is an example of such means but this showing is not intended to imply that equivalent means may not be employed. For example there are types of exhausters which when at rest operate to prevent the passage of anything through them. Inasmuch as there may be additional extensions the cap 7 is illustrated.

Referring to Fig. 1, in the event of a flood of sea water, the exhausters are rendered ineffective as by closing the valve 6. To the extent that air or gas is retained in the battery jar or container, the entry of sea water is prevented or opposed and the described trap opposes the escape of air and so the entry of sea water is opposed or prevented. The gases that are generated in the jar or container, since the trap prevents their escape, except by displacing the sea water in the trap, oppose the entry of sea water into the jar or container.

Referring to Fig. 2, it may be said that the battery room or compartment is in the same way ventilated and the gases pass out from the cell through the trap or seal 10ª. The mode of operation of the construction illustrated in this figure, in the event of the flooding of the battery room or compartment is the same as has been described in connection with Fig. 1, so that in the event of flooding with sea water the air and gases are trapped or confined in the receptacle 1 and cannot be displaced by the entry of sea water and thus they prevent or oppose the entry of sea water. Any air or gases escaping by the trap which has been described can only do so after first displacing sea water from the trap.

What I claim is:

1. In a storage battery the combination of a closed container or jar having an air inlet opening, and a downwardly depending normally open trap applied to said opening to oppose the entry of sea water, substantially as described.

2. In a secondary or storage battery the combination of a closed container or jar provided with an air inlet opening, an exhaust connection communicating with the container or jar and having means for making it ineffective, and a downwardly depending normally open trap applied to the opening to oppose the entry of sea water, substantially as described.

3. In a storage battery the combination of a closed jar or container having a downwardly extending air inlet opening constituting a liquid seal to oppose the entry of sea water.

In testimony whereof I have hereunto signed my name.

BRUCE FORD.

Witnesses:
 Geo. M. Howard,
 Wistar E. Patterson.